United States Patent
Shiba et al.

(10) Patent No.: US 9,770,719 B2
(45) Date of Patent: Sep. 26, 2017

(54) MAINTENANCE APPARTUS AND A METHOD FOR PERFORMING MAINTENANCE ON GRINDING DISCS

(71) Applicants: FLSMIDTH A/S, Valby (DK); Steve Shiba, Sandy, UT (US)

(72) Inventors: Steve Shiba, Midvale, UT (US); Brian Shaw, Midvale, UT (US); Craig Stark, Midvale, UT (US)

(73) Assignee: FLSmidth A/S (DK)

( * ) Notice: Subject to any disclaimer, the term of this patent is extended or adjusted under 35 U.S.C. 154(b) by 0 days.

(21) Appl. No.: 15/323,783

(22) PCT Filed: Aug. 3, 2015

(86) PCT No.: PCT/US2015/043404
§ 371 (c)(1),
(2) Date: Jan. 4, 2017

(87) PCT Pub. No.: WO2016/022466
PCT Pub. Date: Feb. 11, 2016

(65) Prior Publication Data
US 2017/0157617 A1  Jun. 8, 2017

Related U.S. Application Data

(60) Provisional application No. 62/032,789, filed on Aug. 4, 2014.

(51) Int. Cl.
*B02C 17/16* (2006.01)
*B23P 6/00* (2006.01)
*B02C 7/14* (2006.01)

(52) U.S. Cl.
CPC ............ *B02C 17/16* (2013.01); *B02C 7/14* (2013.01); *B23P 6/00* (2013.01)

(58) Field of Classification Search
CPC .................. B02C 17/16; B23P 6/00
See application file for complete search history.

(56) References Cited

U.S. PATENT DOCUMENTS

| | | | | |
|---|---|---|---|---|
| 2,815,529 A * | 12/1957 | Herbolsheimer | ........ | A47B 1/04 108/77 |
| 2013/0255884 A1 * | 10/2013 | Baumann | ........ | B23Q 3/16 156/538 |

FOREIGN PATENT DOCUMENTS

| | | |
|---|---|---|
| CN | 202114626 U | 1/2012 |
| CN | 202803323 U | 3/2013 |
| CN | 203598872 U | 5/2014 |

OTHER PUBLICATIONS

The International Search Report and Written Opinion dated Oct. 26, 2015, 6 pages.

* cited by examiner

*Primary Examiner* — Ryan J Walters
(74) *Attorney, Agent, or Firm* — Matthew R. Weaver; Daniel DeJoseph

(57) ABSTRACT

An apparatus and a method for performing maintenance on grinding discs are disclosed. The apparatus can be positioned below the housing of a vertical grinding mill and attached to the housing in order to provide temporary support for grinding discs when the grinding discs are removed from the housing. The apparatus can be rotated so that it is in a longitudinal position when the grinding discs are within the housing.

6 Claims, 4 Drawing Sheets

MAINTENANCE APPARTUS AND A METHOD FOR PERFORMING MAINTENANCE ON GRINDING DISCS

FIELD OF INVENTION

The present invention relates to grinding mills and, more particularly to apparatuses and methods for performing maintenance on grinding discs in vertical grinding mills.

BACKGROUND OF THE INVENTION

Grinding mills use grinding discs on a rotating shaft to agitate a grinding media load within a housing. The grinding discs are vertically stacked within the housing and are typically separated by spacers placed between each grinding disc (i.e.—a disc stack). As coarse slurry enters one end of the grinding mill and moves to an opposite end, it is sheared and pulverized between the grinding media and the rotating grinding discs. At the opposite end of the grinding mill, finer slurry exits the housing. Accordingly, particle sizes within the slurry are reduced.

One example of such a grinding mill is the FLSmidth® VXPmill™ vertical regrind mill (formally known as the Knelson-Deswik VGM-series mill). The mill has a series of grinding discs (i.e.—a disc stack) which rotate within a barrel-shaped vertical housing filled with grinding media to pulverize particles in coarse feed slurry.

Grinding discs must typically be replaced every three to eight months (depending on the tip speed of the grinding mill) because of excessive wear due to the impact of the grinding media against the grinding discs within the housing. Depending on the volume and mass of the grinding media used within a typical grinding mill, the first third of the total number of grinding discs which are located closest to the slurry feed inlet typically exhibit the greatest amount of wear and are required to be replaced more frequently. In many cases, this first third comprises approximately four grinding discs.

To perform maintenance on grinding discs (for example to remove or replace them) technicians open and drop the bottom flange of the housing base, install bar supports (for example Z-shaped bar supports) on each individual grinding disc within the housing, remove the disc cover from the hub of the bottom-most grinding disc, remove the screws and/or bolts securing each individual grinding disc (typically using a torque tool) and thereafter use a chain hoist to lower each individual grinding disc out of the housing to the ground level. To reach the second or third vertically stacked grinding discs technicians may be required to climb or reach into the housing in order to remove the screws and/or bolts.

The maintenance process using prior art systems as described above is time consuming, burdensome and dangerous and can result in injuries to technicians, superfluous operational downtime, increased labor costs and reduced throughput due to less frequent replacement of grinding discs due to the foregoing disadvantages. For example, it takes a significant amount of time to install Z-shaped bar supports under each of the individual grinding discs within the housing. Each of the Z-shaped supports are required to be attached to the housing with axial screws and/or bolts and rotated into place between each grinding disc. Installing the Z-shaped supports is also burdensome and unsafe. Technicians are required to work within the confines of the housing and are subjected to large, heavy suspended loads. Technician error in installing the individual Z-shaped bar supports result in significant down time, increased labor costs and injuries. Additionally, technicians spend more time removing the screws and/or bolts securing each individual grinding disc because their mobility within the housing is limited. This results in additional downtime and increased labor costs.

We have determined that a new type of maintenance apparatus is needed in order to increase safety and to reduce the costs and time associated with the maintenance of grinding discs. According to some embodiments, advantages which may be realized through the practice of our invention may include one or more of the following: providing a safer environment for technicians to perform maintenance on grinding discs, reducing maintenance costs associated with the removal and replacement of grinding discs and reducing the time-consuming process for removing such discs which may result in increased throughput, without limitation.

SUMMARY OF THE INVENTION

An apparatus is provided for performing maintenance on grinding discs of a vertical grinding mill comprising a temporary supporting means, a plurality of attaching means for rotatably attaching the temporary supporting means to housing; wherein the temporary supporting means is rotatably positionable in the lateral direction below the housing; and wherein the temporary supporting means is capable of providing support for grinding discs. The temporary supporting means can be rotatably positionable in the longitudinal direction when the grinding discs are within said housing. The temporary supporting means can be comprised of an accessing means wherein the accessing means provides access to the grinding discs. One or more of the plurality of attaching means can be comprised of a block, a hinge and a pin, the block, hinge and pin cooperating to attach the temporary supporting means to the housing. The temporary supporting means can be comprised of a plate; the plate being configured to cooperate with the attaching means.

The apparatus can also be comprised of a safety bar and a plurality of locking means, wherein the safety bar is attached to the temporary supporting means by one or more of the plurality of locking means and wherein the safety bar is capable of providing support for the grinding discs when the grinding discs are within the housing. One or more of the plurality of locking means can be comprised of a clevis and a pin, the clevis and pin cooperating to attach the support bar to the temporary supporting means.

A method for performing maintenance on grinding discs of a vertical grinding mill is also provided. The method comprises the steps of positioning a temporary supporting means in the lateral direction below housing; attaching the temporary supporting means to the housing with attaching means; lowering one or more of a plurality of the grinding discs onto the temporary supporting means; and removing one or more of a plurality of the grinding discs.

Other details, objects, and advantages of the invention will become apparent as the following description of certain present exemplary embodiments thereof and certain present exemplary methods of practicing the same proceeds.

BRIEF DESCRIPTION OF THE DRAWINGS

Exemplary embodiments of an apparatus and a method for performing maintenance on grinding discs are shown in the accompanying drawings. It should be understood that like reference numbers used in the drawings may identify like components.

DETAILED DESCRIPTION OF EXEMPLARY EMBODIMENTS

Figure 1:
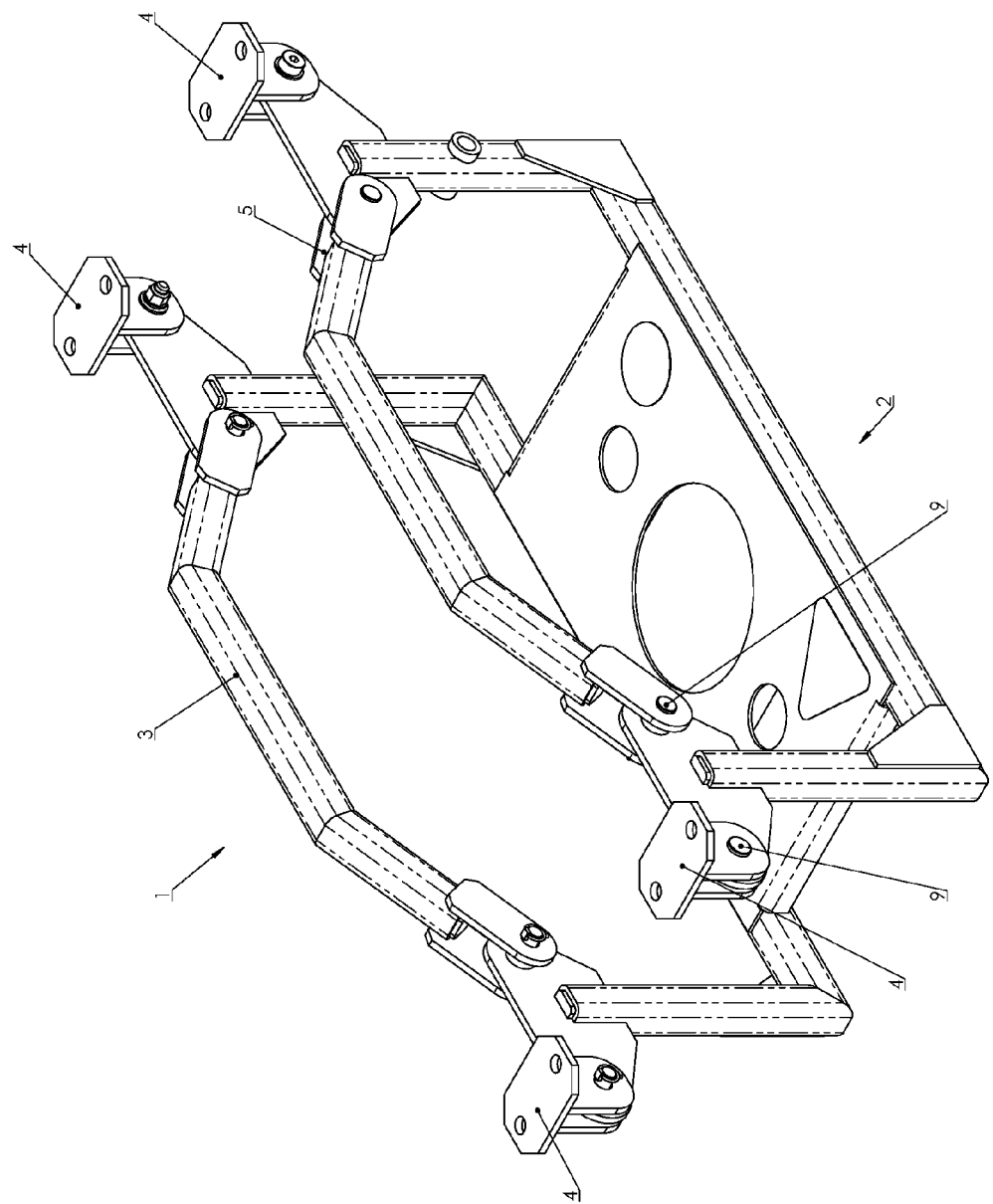
FIG. 1 is a three dimensional model of an apparatus for performing maintenance on grinding discs according to an exemplary embodiment of the invention.
Figure 2:
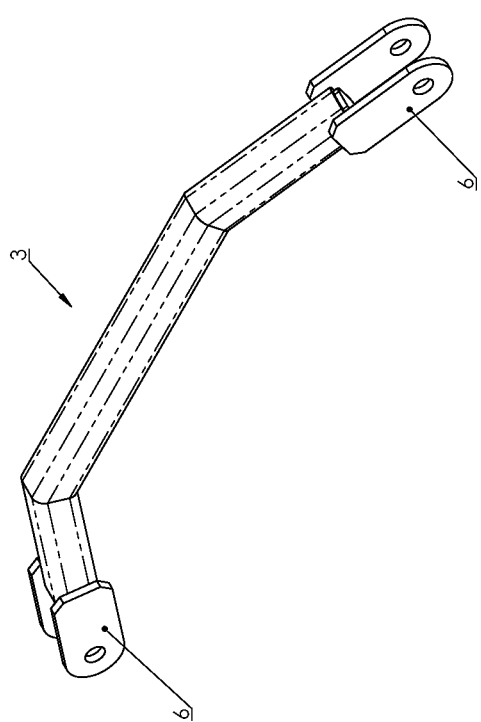
FIG. 2 is a three dimensional model of a safety bar according to an exemplary embodiment of the invention.
Figure 3:
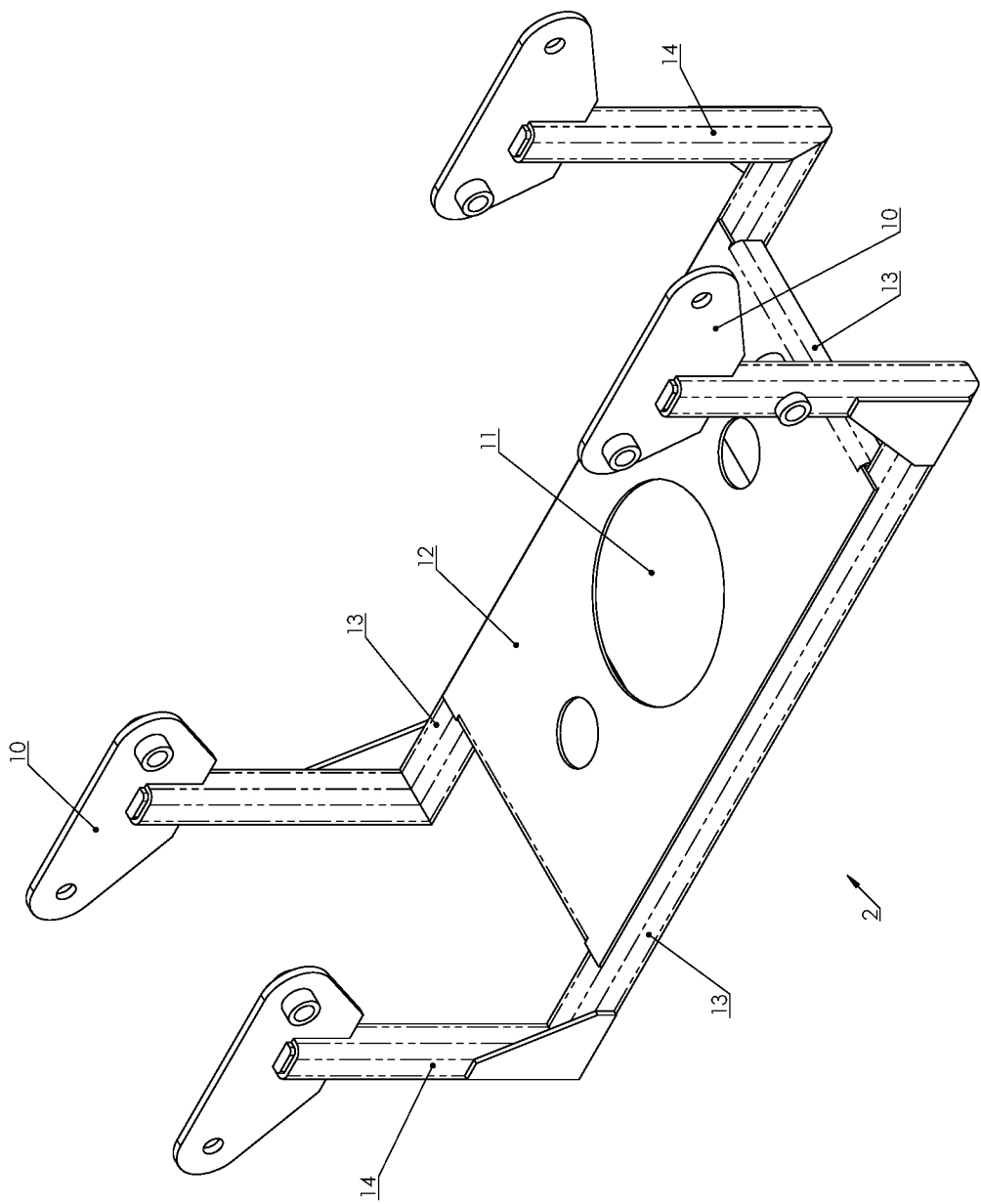
FIG. 3 is a three dimensional model of a temporary supporting means according to an exemplary embodiment of the invention.

Referring to FIG. 1 through FIG. 3, an apparatus 1 for performing maintenance on grinding discs of a vertical grinding mill has a temporary supporting means 2 and a plurality of attaching means 4. The plurality of attaching means 4 are configured to attach the temporary supporting means 2 to the housing of the vertical grinding mill so that the temporary supporting means is rotatable. The temporary supporting means 2 is positionable in the longitudinal direction when the grinding discs are within the housing of the grinding mill, for example when the grinding mill is in operation. The temporary supporting means 2 is positionable in the lateral direction below the housing. When positioned in the lateral direction below the housing, the temporary supporting means 2 is capable of providing support for the weight of grinding discs. For example, when the flange of the housing of the vertical grinding mill is opened the grinding discs can be lowered from the housing and can be set on and supported by the temporary supporting means 2. The temporary supporting means 2 and plurality of attaching means 4 can be made of a high strength metal, for example A36 steel or alloy steel, in order to support the full weight of the grinding discs.

As may be appreciated from FIG. 3, in an exemplary embodiment the temporary supporting means 2 has a horizontal sheet 12, and one or more of a plurality of vertical members 14 extending upwardly from base members 13 running substantially parallel to the horizontal sheet 12. In another embodiment, the one or more plurality of vertical members 14 may extend upwardly from the horizontal sheet 12. The horizontal sheet 12, plurality of vertical members 14 and the base members 13 can be welded together or can be attached by other standard techniques for fusing metals. The upper ends of one or more of a plurality of vertical members 14 may contain plates 10. The plates 10 can have holes. The plates 10 can have screws, or other similar fasteners extending through them. The temporary supporting means 2 may have an accessing means 11, such as a hole, which allows technicians easy access the underbody of the hubs of the grinding discs when the grinding discs are removed from the housing and supported on the temporary supporting means 2.

Figure 4:
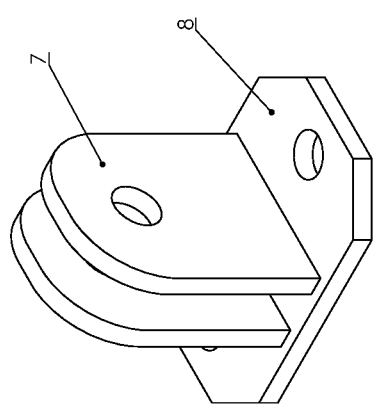
FIG. 4 is a close-up view of a hinge and block according to an exemplary embodiment of the invention.

In one exemplary embodiment, one or more of the plurality of attaching means 4 can be affixed to the housing of the vertical grinding mill with fasteners, such as washers, nuts, or screws. Alternatively, one or more of the plurality of attaching means 4 can be welded or soldered to the housing of the vertical mill. One or more of the plurality of attaching means 4 may be hinges 7 and blocks 8, as shown in FIG. 4. Fasteners can be thread through the block 8 to attach one or more of a plurality of attaching means 4 to the housing.

As may also be appreciated from FIG. 1, pins 9, for example a clevis pin or a pin with a locking ring, or fasteners can be inserted through the hinge 7 and through the temporary supporting means 2 to secure the temporary supporting means 2 to attaching means 4 secured to the housing so that the temporary supporting means 2 extends laterally across the housing. Pins 9 can easily be removed and the temporary supporting means 2 can rotate into the longitudinal position when, for example, the grinding mill is in operation and the grinding discs are within the housing. Pins 9 provide an easy and efficient way to rotatably attach the temporary supporting means 2 to the housing. In one embodiment, where the temporary supporting means 2 has a plate 10, the plate 10 is inserted into the hinge 7 and a pin 9 is inserted through the hinge 7 and through the plate 10 of the temporary supporting means 2 in order to attach the temporary supporting means 2 to the housing.

As may also be appreciated from FIG. 1, the apparatus 1 may have a safety bar 3 (as shown in for example FIG. 2). Safety bar 3 is configured to extend laterally across the housing and is capable of providing temporary support for the grinding discs when the grinding discs are within the housing. Safety bar, FIG. 2, can be attached to the temporary support means 2 by one or more locking means 5. In an exemplary embodiment, the locking means 5 is a clevis 6 and a pin 9 wherein the pin 9 and the clevis 6 attach safety bar 3 to the temporary supporting means 2. In one exemplary embodiment a pin 9 is inserted through the hole in the plate 10 of the temporary supporting means 2 and through the clevis 6 to lock safety bar 3 to temporary supporting means 2. In alternative embodiments, a pin 9 with a locking ring or a fasteners can be used to attach the safety bar to the temporary supporting means. In yet another embodiment, safety bar 3 is attached directly to the attaching means 2 using a pin 9 or other fasteners.

It should also be appreciated that the apparatus 1 can be rotated from the longitudinal position to the lateral position manually. Alternatively, the apparatus 1 may be automated. For example, a hoist system or a hydraulic system can be implemented to cooperate with the plurality of attaching means 2 to rotate the apparatus 1 from the longitudinal position to the lateral position.

Because the apparatus 1 contemplated herein supports the weight of the grinding discs outside of the housing, technicians can more easily access the grinding discs and are not confined to small work spaces in the housing. Additionally, maintenance time and costs can be reduced because individual Z-shaped supports are not required to be installed. Instead the apparatus 1 is configured to support the entire disc stack outside the housing. The apparatus is easy to install and rotating the temporary support means 2 from the lateral to longitudinal position requires little effort. Further, technician safety is assured. The apparatus 1 allows for a technician to work directly under the grinding discs and prevents the technician from being subjected to the heavy loads of the grinding discs that are being suspended above.

A method for performing maintenance on grinding discs of a vertical grinding mill is also contemplated. Such a method may include: positioning a temporary supporting means 2 in the lateral direction below housing; attaching the temporary supporting means 2 to the housing with one or more of a plurality of attaching means 4; lowering one or more of a plurality of the grinding discs onto the temporary supporting means 2; and removing one or more of a plurality of the grinding discs. Alternative methods for performing maintenance on grinding discs may include the steps of attaching a safety bar 3 to temporary supporting means 2 with locking means 5; lowering one or more of a plurality of grinding discs onto safety bar 3; and thereafter removing the safety bar 3.

While certain present exemplary embodiments of the apparatus and certain embodiments of methods of practicing the same have been shown and described, it is to be distinctly understood that the invention is not limited thereto but may be otherwise variously embodied and practiced within the scope of the following claims.

LIST OF REFERENCE IDENTIFIERS

1—apparatus
2—temporary supporting means
3—safety bar
4—attaching means
5—locking means
6—clevis
7—hinge
8—block
9—pins
10—plate
11—accessing means
12—horizontal sheet
13—base members
14—vertical members

What is claimed is:

1. A vertical grinding mill comprising:
a housing;
one or more grinding discs, the one or more grinding discs being located within the housing when the vertical grinding mill is in operation and the one or more grinding discs being locatable at least partially below the housing when the vertical grinding mill is not in operation; and
an apparatus for providing support for the one or more grinding discs during maintenance on the one or more grinding discs when the vertical grinding mill is not in operation, the apparatus being located below the housing and further comprising:
a horizontal sheet disposed on a plurality of lateral base members;
a plurality of vertical members attached to and extending upwardly from the one or more lateral base members; and
a plurality of attaching means connected to a top portion of the plurality of vertical members for rotatably attaching the horizontal sheet via the vertical members to a bottom portion of the housing.

2. The vertical grinding mill of claim 1 wherein the apparatus is rotatably positionable in the longitudinal direction when the grinding discs are located within the housing and when the vertical grinding mill is in operation.

3. The vertical grinding mill of claim 1 further comprising:
a safety bar and a plurality of locking means, wherein the safety bar is attached to the attaching means by one or more of the plurality of locking means.

4. The vertical grinding mill of claim 3 wherein one or more of the plurality of locking means are comprised of a clevis and a pin.

5. The vertical grinding mill of claim 1 wherein the horizontal sheet comprises an opening wherein the opening provides access to the grinding discs.

6. The vertical grinding mill of claim 1 wherein one or more of the plurality of attaching means are comprised of a plate, a block, a hinge and a pin.

* * * * *